US011284455B2

(12) United States Patent
Cui et al.

(10) Patent No.: US 11,284,455 B2
(45) Date of Patent: *Mar. 22, 2022

(54) METHOD AND APPARATUS FOR SESSION MANAGEMENT IN A WIRELESS NETWORK

(71) Applicant: AT&T Intellectual Property I, L.P., Atlanta, GA (US)

(72) Inventors: Zhi Cui, Sugar Hill, GA (US); Jiansong Wang, Parlin, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 223 days.

This patent is subject to a terminal disclaimer.

(21) Appl. No.: 16/592,092

(22) Filed: Oct. 3, 2019

(65) Prior Publication Data

US 2020/0037377 A1 Jan. 30, 2020

Related U.S. Application Data

(63) Continuation of application No. 15/156,052, filed on May 16, 2016, now Pat. No. 10,440,760.

(51) Int. Cl.
| | |
|---|---|
| H04W 76/11 | (2018.01) |
| H04L 29/12 | (2006.01) |
| H04W 8/26 | (2009.01) |
| H04W 36/08 | (2009.01) |
| H04W 84/12 | (2009.01) |

(Continued)

(52) U.S. Cl.
CPC ......... *H04W 76/11* (2018.02); *H04L 61/2015* (2013.01); *H04W 8/26* (2013.01); *H04W 36/08* (2013.01); *H04W 84/12* (2013.01); *H04W 88/02* (2013.01)

(58) Field of Classification Search
CPC ...... H04W 76/11; H04W 8/26; H04L 61/2015
See application file for complete search history.

(56) References Cited

U.S. PATENT DOCUMENTS

| 8,400,983 B2 | 3/2013 | Nakagawa et al. |
| 8,477,785 B2 | 7/2013 | Kant et al. |
| | (Continued) | |

FOREIGN PATENT DOCUMENTS

KR 100909014 B1 7/2009

OTHER PUBLICATIONS

US 9,338,737 B2, 05/2016, Cui et al. (withdrawn)

*Primary Examiner* — Walter J Divito
*Assistant Examiner* — Anthony Luo

(57) ABSTRACT

A method and apparatus for session management in a wireless network are disclosed. For example, a user endpoint (UE) device, sends a request for a session internet protocol (IP) address assignment using an interface IP address, configures the UE device with the session IP address, provides to a controller an association of the interface and session IP addresses, and receives packets addressed to the session IP address via an access network entity associated with the interface IP address. In one example, a controller receives an association of an interface IP address with a session IP address from an attached UE device, provides to a network node an update on a route to reach the session IP address through the interface IP address, identifies an active interface IP address to receive packets, and configures an open flow switch or router for routing the packets towards the active interface IP address.

20 Claims, 9 Drawing Sheets

(51) Int. Cl.
H04W 88/02 (2009.01)
H04L 61/5014 (2022.01)

(56) References Cited

U.S. PATENT DOCUMENTS

| | | |
|---|---|---|
| 9,055,081 B2 | 6/2015 | Bonnier et al. |
| 9,148,814 B2 | 9/2015 | Cui et al. |
| 9,210,620 B2 | 12/2015 | Murai et al. |
| 9,226,197 B2 | 12/2015 | Cui et al. |
| 9,241,327 B2 | 1/2016 | Zhu et al. |
| 9,258,696 B2 | 2/2016 | Sundaram et al. |
| 9,298,560 B2 | 3/2016 | Janakiraman et al. |
| 9,300,766 B2 | 3/2016 | Small et al. |
| 9,479,951 B2 | 10/2016 | Curtin et al. |
| 2008/0205393 A1 | 8/2008 | Jeong |
| 2011/0064093 A1 | 3/2011 | Mattson et al. |
| 2011/0209000 A1 | 8/2011 | Hamman |
| 2011/0287743 A1 | 11/2011 | Hu |
| 2012/0002570 A1 | 1/2012 | Nishida |
| 2012/0258674 A1 | 10/2012 | Livet et al. |
| 2014/0003357 A1 | 1/2014 | Ejzak |
| 2014/0241267 A1 * | 8/2014 | Cherian ................ H04L 61/103 370/329 |
| 2016/0100357 A1 | 4/2016 | Cui et al. |
| 2016/0113030 A1 | 4/2016 | Cui et al. |
| 2016/0127889 A1 | 5/2016 | Cui et al. |
| 2016/0212679 A1 | 7/2016 | Wang |

\* cited by examiner

| NETWORK ENTITY | PREFIX FOR IP ADDRESS | TYPE OF RADIO ACCESS TECHNOLOGY | CELL-TYPE | AIRLINE LOAD | BACKHAUL CONDITION |
|---|---|---|---|---|---|
| CELL 182 | 1.1 | LTE | METRO | L | L |
| CELL 186 | 1.2 | LTE | MACRO | H | M |
| CELL 184 | 3.0 | WIFI |  | L | H |
| CELL 185 | - | LTE | MACRO | - | - |

FIG. 3

METHOD AND APPARATUS FOR SESSION MANAGEMENT IN A WIRELESS NETWORK

This application is a continuation of U.S. patent application Ser. No. 15/156,052, filed May 16, 2016, now U.S. Pat. No. 10,440,760, which is herein incorporated by reference in its entirety.

The present disclosure relates to a method and apparatus for session management in a wireless network, e.g., a wireless communications network of a network service provider.

BACKGROUND

As popularity of Internet of Things (IoT) devices, smart phones, etc., continues to grow, the bandwidth and processing demand on cellular networks continues to grow as well. Furthermore, current session management procedures for cellular networks involve complex connection-oriented control procedures.

SUMMARY

In one example, the present disclosure discloses a device, computer-readable medium, and method for providing session management in a wireless network. In one example, the method sends, via a processor of a user endpoint device, to a serving network a request for a session internet protocol address assignment using an interface internet protocol address of the user endpoint device, configures the user endpoint device with the session internet protocol address when a response to the request for the session internet protocol address assignment is received, wherein the response includes a session internet protocol address that is assigned, provides to a controller an association of the interface internet protocol address with the session internet protocol address, and receives one or more packets addressed to the session internet protocol address, wherein the one or more packets are received via an access network entity associated with the interface internet protocol address of the user endpoint device.

In another example, a method receives, via a processor of a controller, an association of an interface internet protocol address with a session internet protocol address from a user endpoint device, wherein the user endpoint device has been granted an attachment via the interface internet protocol address prior to receiving the association, provides to a network node, an update on a route to reach the session internet protocol address through the interface internet protocol address, identifies an active interface internet protocol address of the user endpoint device to receive the one or more packets, when one or more packets are received for the user endpoint device, and configures an open flow switch or router for routing the one or more packets towards the active interface internet protocol address of the user endpoint device that is identified.

BRIEF DESCRIPTION OF THE DRAWINGS

The teaching of the present disclosure can be readily understood by considering the following detailed description in conjunction with the accompanying drawings, in which:

FIG. 3 illustrates the example network table used by a controller for managing network conditions;

To facilitate understanding, identical reference numerals have been used, where possible, to designate identical elements that are common to the figures.

DETAILED DESCRIPTION

Figure 1:
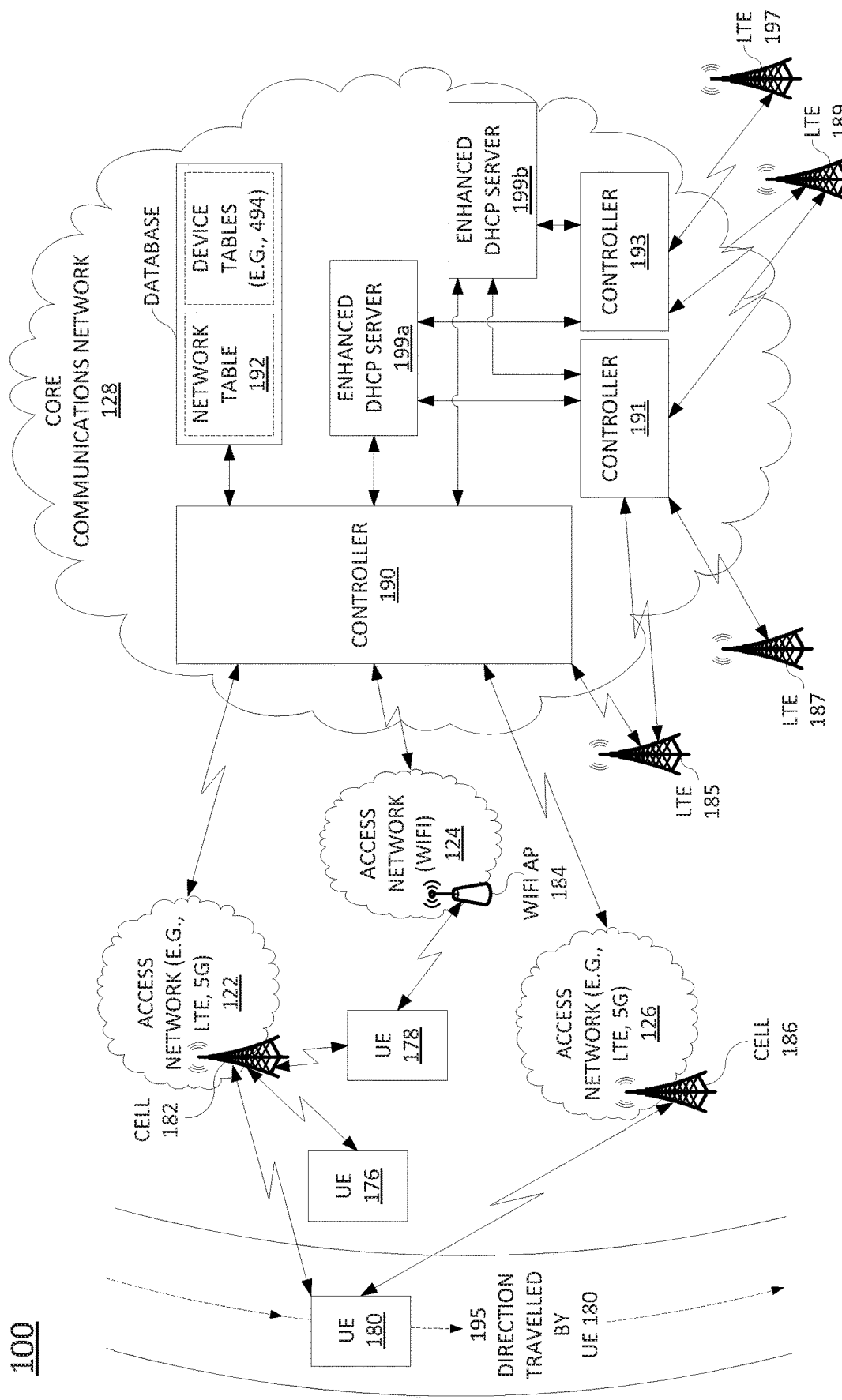
FIG. 1 illustrates an example network related to the present disclosure.

The present disclosure relates to a method and apparatus for session management in a wireless network, e.g., a wireless communications network of a communications network service provider (broadly a network service provider). The teachings of the present disclosure can be applied via any type of session management protocols defined for various cellular technologies, e.g., Third Generation Partnership Project (3GPP) technologies.

As popularity of Internet of Things (IoT) devices, smart phones, etc., continues to grow, the bandwidth and processing demand on cellular networks due to machine-to-machine (M2M) communication also continue to grow. However, the high demand is not merely due to the increase in the number of user endpoint (UE) devices. There is tremendous growth in the number of services accessed by each UE device. For example, in a Long Term Evolution (LTE) architecture, one or more bearers may be established to connect a single UE device to multiple packet data networks (PDNs), e.g., the Internet, a corporate Intranet network, etc. The bearers may also be simply described as concatenated tunnels, i.e., tunnels that are concatenated for connecting UEs to PDNs. The bearers may also be referred to as packet data protocol (PDP) contexts.

When the UE is activated, a PDP context or bearer is established to connect the UE to a PDN location and serve the UE as a default PDP context. For example, when the UE is turned on and is successfully authenticated, a first PDP context may be established between the UE and a default PDN gateway (P-GW). Subsequently, other PDP contexts may be activated between the UE and the same or other P-GWs based on the number of services and/or the types of services that the UE is entitled to access. As such, each UE device may establish multiple PDP contexts or PDN connections in wireless networks, e.g., cellular networks.

The multiple PDP contexts are associated with multiple logical connections and multiple session Internet Protocol (IP) addresses. Hence, the session management procedures in a cellular network add significant complexity. For example, a data session connection between a UE device and a P-GW within the cellular network involves complex connection oriented control and user plane procedures.

The control plane procedure may be performed via a control plane protocol, e.g., a 3GPP Non-Access Stratum (3GPP NAS) protocol and General Packet Radio Service (GPRS) Tunneling Protocol-Control plane (GTP-C). The 3GPP NAS is used for messages that are exchanged between the UE and the core network nodes. An access stratum is used for communication between the UE and the radio network, i.e., over the wireless portion of the network. Messages that use the 3GPP NAS protocol traverse the radio network, transparently, to reach the core network. Example messages that use the 3GPP NAS protocol may include attach messages, authentication messages, service requests, update messages, and the like. Once the UE successfully establishes a radio connection, the UE uses the radio connection to communicate with the network nodes to coordinate a service. For example, the 3GPP NAS protocol may be used for communication between the UE and the core network nodes, such as a Mobile Management Entity (MME), a Serving GPRS Support Node (SGSN), etc.

Similarly, the user plane procedures may be performed via a complex user plane tunneling protocol, e.g., GPRS Tunneling Protocol (GTP)-User plane (GTP-U) and/or Generic Routing Encapsulation (GRE) tunnel. For example, GTP-U tunnel can be defined for each PDP context and GTP-C tunnel can be defined for all PDP contexts with the same PDP address and access point network (APN). The proliferation of mobile devices has made GPRS Tunneling Protocol (GTP) popular mainly due to its support of mobility features. GTP enables the IP addresses to remain the same and packets to continue to be forwarded to UEs while the UE is physically mobile. The mobility is supported by providing tunneling between the base station and the P-GW, through the serving gateway. The IP address of the UE is encapsulated inside a GTP by the base station. Thus, the IP address of the UE is secure, as it traverses a tunnel between the base station and the serving gateway.

As can be readily seen, the tunnel based approach of the GTP is connection oriented. However, as the number of IoT devices grows, connection based communication may be inefficient. This is mainly because session management using GTP needs tremendous amount of control plane signaling. In real world scenarios, IoT devices vary on their need for mobility. For example, an IoT device may be a meter reader that occasionally wakes up, takes measurements, reports to a network, and after a period of time returns back to a sleep mode. In another example, an IoT device may be a mobile phone that is constantly communicating with a social network server, a cellular network service provider, etc. In yet another example, an IoT device may be a computer located at a specific physical location, always communicating through a specific access network. For devices where mobility is not a main factor, the connection oriented approach is inefficient in terms of using network resources. For example, for the meter reader described above, a connection oriented approach that maintains a tunnel is unnecessarily overloading the network with control plane messages.

In one embodiment, the present disclosure provides a method, a computer readable medium, and an apparatus for managing sessions in a wireless network via a connectionless mechanism using a native IP based protocol. The method of the present disclosure provides two types of addresses to the UE: a first type for one or more interface IP addresses and a second type for one or more session layer IP addresses.

An interface IP address of a UE device comprises an Internet Protocol address, e.g., an IP Version 6 (IPv6) address that is assigned to the UE device when the device attaches to an access network entity of a wireless network, e.g., a cell site (cell) of a cellular network, an Access Point (AP) of a Wi-Fi network, and the like.

In one example, the interface IP address is formed as a combination of a physical address of the UE device (described below) and a physical interface address prefix (or broadly a site prefix). The site prefix is obtained from the respective cell or access point. Each cellular site, Wireless Fidelity (Wi-Fi) Access Point (Wi-Fi AP), 5G Radio Access Network (RAN) access point and the like, has a physical interface address prefix that is broadcast over the air. The UE device is then able to acquire the site prefixes of any number of access network entities that serve the geographical area at which the UE device is located.

The physical address of the UE device may also be referred to as the burned in physical address. In one embodiment, the physical address of the UE device may comprise an address assigned by a service provider of the wireless network. For example, the wireless service provider may provide to the UE a private network address that may not be globally reachable.

The interface IP address of the UE device is globally unique when the device is attached to a wireless network. For example, no two UE devices can have the same interface IP address while they are attached to a cell or access point. In one embodiment, the interface IP address is used by a controller for managing mobility of the UE device. The controller may comprise a Software Defined Network (SDN) controller.

The UE device may have multiple interface IP addresses. For example, the UE device may be attached to multiple access networks via multiple access network entities, with each access network entity being used to attach to a respective access network of the multiple access networks. Each interface IP address may be formed by combining the physical address of the UE device with a site prefix of an access network entity (e.g., a cell or AP). For example, if one Wi-Fi AP prefix and one cell site prefix are detected by a UE device, the UE device may learn two interface IP addresses: a first interface IP address that is formed as a combination of the physical address of the UE device with the Wi-Fi AP prefix, and a second interface IP address that is formed as a combination of the physical address of the UE device with the cell site prefix.

In one example, a session layer IP address comprises a service IP address of a device's application layer. The session layer IP address may also be referred to as an application session layer IP address, or an application layer address. The UE device may have a need for multiple applications. Hence, the UE device may have multiple session layer IP addresses to satisfy various requirements, e.g., quality of service, associated with the multiple applications.

FIG. 1 illustrates an example network 100 related to the present disclosure. In one illustrative embodiment, the network 100 comprises UE devices 176, 178 and 180, radio access networks 122, 124 and 126, and a simplified core communications network 128.

The UE devices 176, 178 and 180 may comprise any appropriate type of user equipment, e.g., a mobile phone, a computing tablet, a smart phone, any type of sensors, e.g., a camera, a meter, a motion sensor, a speed sensor, a temperature sensor, a chemical sensor, a flow sensor, a gas sensor and the like. It should be noted that various types of sensors (broadly automotive, acoustic, chemical, optical, navigational, proximity, and/or presence sensors) can be configured with the necessary communication interfaces to interact with various types of access networks. Some UE devices may be mobile while others may be stationary. For example, a fixed meter may be stationary, a camera may be mobile (e.g., stadium or aerial coverage camera) or stationary (e.g., traffic camera), smart phones may be mobile, etc. The UE device may be a device that communicates via a machine-to-machine (M2M) communications interface or may be a device to be used via a human-machine interface. For example, the UE device may be a smart phone to be used by a human for communication (e.g., voice call or text) or a meter that collects data via sensors and reports to a server via an M2M interface. It is to be understood that the UE devices depicted in FIG. 1 are only examples and not intended to be limiting.

The radio access networks 122, 124 and 126 may comprise cellular or other wireless technologies, e.g., Wi-Fi networks, LTE networks, 5G networks, and the like. For example, access network 122 may be for a metro cell, access network 124 may be for a Wi-Fi technology, and access network 126 may be for a macro cell. The access networks 122, 124 and 126 comprise cell sites and access points for their respective access network.

FIG. 1 also depicts network entities 182, 184, 186, 185, 187, 189 and 197, controllers 190, 191 and 193, and enhanced Dynamic Host Configuration Protocol (DHCP) servers 199a and 199b. The core network 128 may comprise the controllers, routers, switches, DHCP servers, and the like. In one illustrative example, the controllers 190, 191 and 193 are communicatively coupled to the enhanced DHCP servers 199a and 199b.

A controller, as described herein, may comprise any appropriate controller, such as, for example, an SDN based controller. Network entities 182, 184, 186 and 185 may be controlled by SDN controller 190, network entities 185, 187 and 189 may be controlled by SDN controller 191, and network entities 189 and 197 may be controlled by SDN controller 193. The network entities 182, 184, 186, 185, 187 and 189 may comprise various types of access network entities. For example, access network entity 182 may comprise a metro cell, access network entity 186 may comprise a macro cell, and access network entity 184 may comprise a Wi-Fi access point. For simplicity, the access network entity 182 may simply be referred to as cell 182, the access network entity 186 may simply be referred to as cell 186, and the access network entity 184 may simply be referred to as Wi-Fi AP 184.

The controllers may manage and/or maintain network conditions and/or device conditions. In order to manage and maintain network conditions, the controller may gather appropriate information pertaining to the network being manage and store the information. For example, the controller 190 may gather and maintain information via a network table 192. The other controllers may also have respective network tables. However, FIG. 1 shows only a single network table 192 for controller 190 for clarity.

In an example configuration, controller 190 may be tasked with determining network condition information for cell 182, cell 186 and Wi-Fi AP 184. In turn, cell 182, cell 186, and Wi-Fi AP 184 may be communicatively coupled to the controller 190 as shown. For example, UE device 176 may be connected to (e.g., communicatively coupled to) cell 182 and have packets of information to send to cell 182. UE device 178 may be connected to (e.g., communicatively coupled to) cell 182 and Wi-Fi AP 184. UE device 178 may be executing voice and video applications. UE device 178 may not be moving at a point in time, and may desire multi-path connectivity for one or more sessions in the future. UE device 180 may be connected to (e.g., communicatively coupled to) cell 182 and cell 186. UE device 180 may be moving in the direction illustrated by arrow 195, e.g., on a road. That is, UE device 180 may be moving away from cell 182 and toward cell 186. UE device 180 may be in the process of being handed over from one access network entity (e.g., cell 182) to another access network entity (e.g., cell 186).

Figure 2:
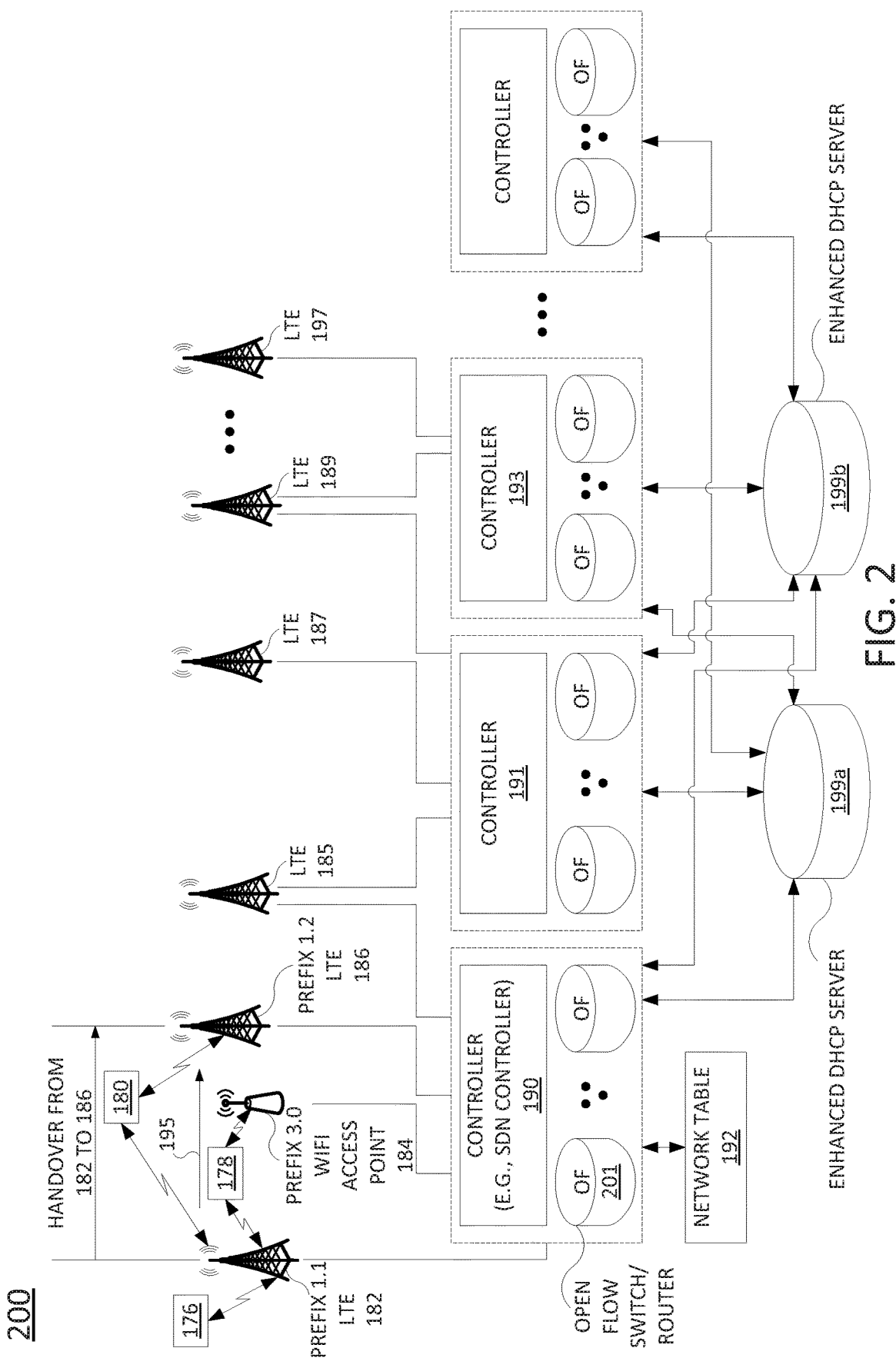
FIG. 2 illustrates an example handover of the user endpoint device from one network entity to another network entity.

FIG. 2 illustrates an example handover of the UE device from one access network entity to another access network entity. For example, UE device 180 may be handed over from cell 182 to cell 186 via the mobility management procedure of the present disclosure.

In FIG. 2, UE device 176 may comprise a meter reader or the like, UE Device 178 may comprise a smart phone or the like, and UE device 180 may comprise a smart device (e.g., a tablet, phablet, etc.) or the like. The smart device 180 may be a device moving in the direction of arrow 195, physically getting further away from cell 182 and getting closer to cell 186. When a handover occurs, a controller (e.g., controller 190) may perform a configuration update in a switch/router (e.g., in an open flow switch/router 201) to forward packets directed to the smart device 180 via the new cell serving device 180, i.e., cell 186.

FIG. 3 illustrates the example network table 192 used by a controller, e.g., controller 190, for managing network conditions. Table 192 may be stored in a database associated with controller 190. In an example configuration, the network table 192 may comprise an Enhanced Automatic Network Routing (E-ANR) table. Network table 192 may comprise information about each access network entity (e.g., each cell and access point) that is coupled to and/or is managed by the controller 190. In one example, column 306 of table 192 provides a list of access network entities included in the table, e.g., cell 182 (at row 326), cell 186 (at row 328), Wi-Fi AP 184 (at row 330), and cell 185 (at row 331).

To effectuate mobility management, one or more IP addresses may be assigned to a device and/or an access network entity. In an example configuration, a controller (e.g., controller 190) may determine an IP address for each device and access network entity within the purview of the controller. For example, table 192 shows (in column 308 and row 326) that the prefix for an IP address associated with cell 182 is 1.1. Similarly, table 192 shows (in column 308, and row 328) that the prefix for an IP address associated with cell 186 is 1.2. Similarly, table 192 shows (in column 308 and row 330) that the prefix for the Wi-Fi AP 184 is 3.0. Note that cell 185 is not involved in the handover of device 180 from cell 182 to cell 186. Thus, for the sake of simplicity, no prefix is shown for cell 185 in table 192. However, any appropriate prefix may be assigned to cell 185, as described herein.

It is to be understood that the prefixes shown in table 192 are examples, and they are not to be construed as limiting, e.g., any prefix values can be used. Thus, any appropriate prefix may be assigned to a cell or an access point (i.e., a network entity).

As shown in table 192, the type of radio access technology for each access network entity may be provided. For example, column 310, row 326 indicates that cell 182 is an LTE cell. Column 310, row 328 indicates that cell 186 is an LTE cell. Column 310, row 330 indicates that access point 184 is a Wi-Fi access point. Column 310, row 331 indicates that cell 185 is an LTE cell.

As shown in table 192, column 312, the cell type for each cell may also be listed. For example, column 312, row 326 indicates that cell 182 is a metro cell, column 312, row 328, indicates that cell 186 is a macro cell, and column 312, row 331 indicates that cell 185 is a macro cell. Other examples of cell types may include femto cell, pico cell, umbrella cell, or the like.

The load for a cell may also be included in the network table. For example, as depicted in table 192, airline load and backhaul load may be listed as shown in columns 314 and 316, respectively. As depicted in table 192, column 314, row 326, the airline load for cell 182 is low (L) (e.g., approximately 30% loaded). As depicted in table 192, column 316, row 326, the backhaul load for cell 182 is low (L) (e.g., approximately 30% loaded). As depicted in table 192, column 314, row 328, the airline load for cell 186 is high (H) (e.g., approximately 80% loaded). As depicted in table 192, column 316, row 328, the backhaul load for cell 186 is medium (M) (e.g., approximately 65% loaded). As depicted in table 192, column 314, row 330, the airline load for access point 184 is low (L) (e.g., approximately 30% loaded). As depicted in table 192, column 316, row 330, the backhaul load for access point 184 is high (H) (e.g., approximately 80% loaded).

The controller 190 may determine load in any appropriate manner. For example, an LTE eNodeB may monitor and report the utilization of data and control channels to a mobility controller according to the percentage of times the data and control channels are idle or available over a specified time interval.

As described above and illustrated in FIG. 3, the controller may gather network conditions and store information needed for managing the network. Similarly, the controller may generate, update, and/or maintain information pertaining to devices, e.g., UE devices.

Figure 4:
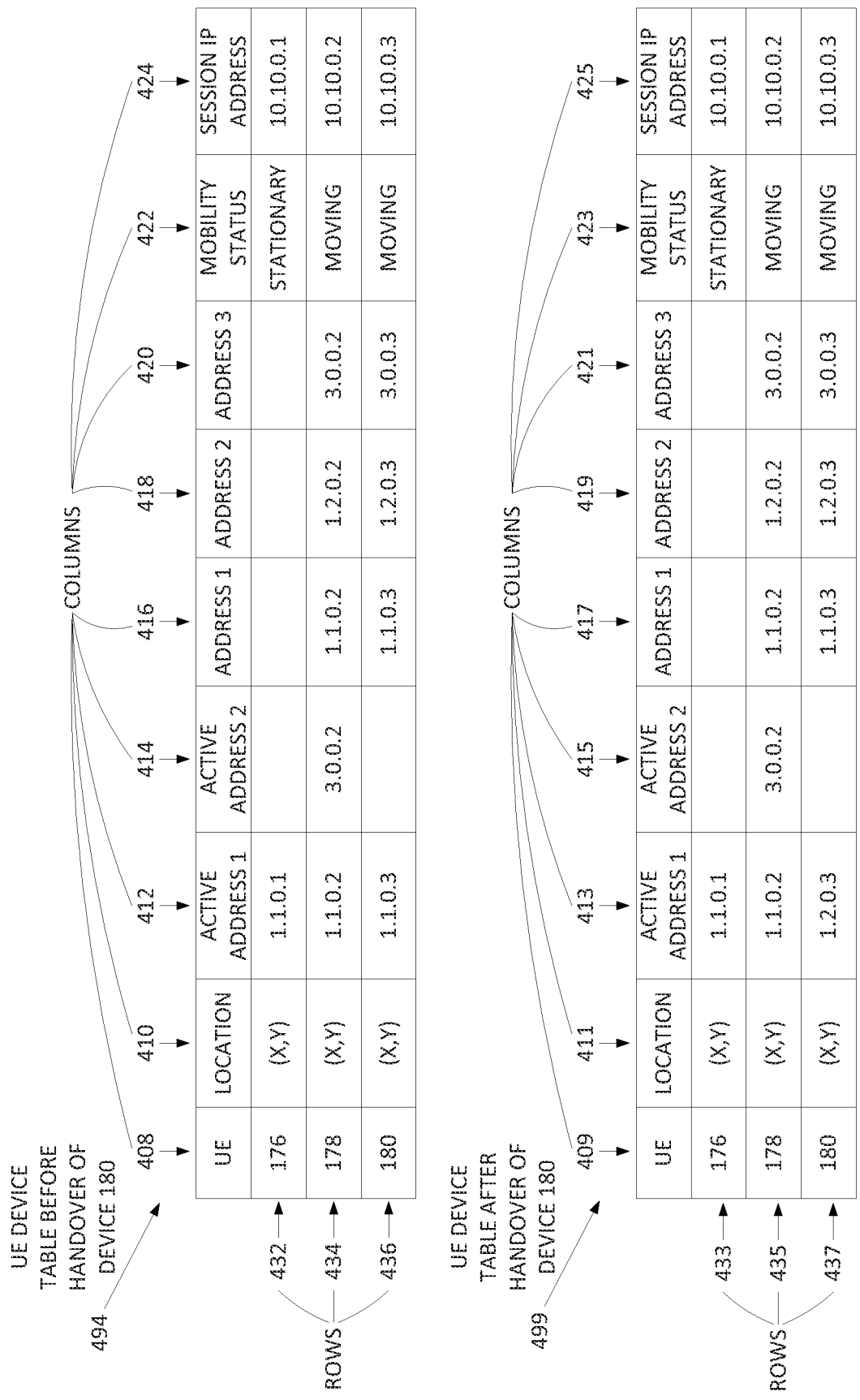
FIG. 4 depicts an example device table pertaining to devices before and after a handover.
Figure 5A:
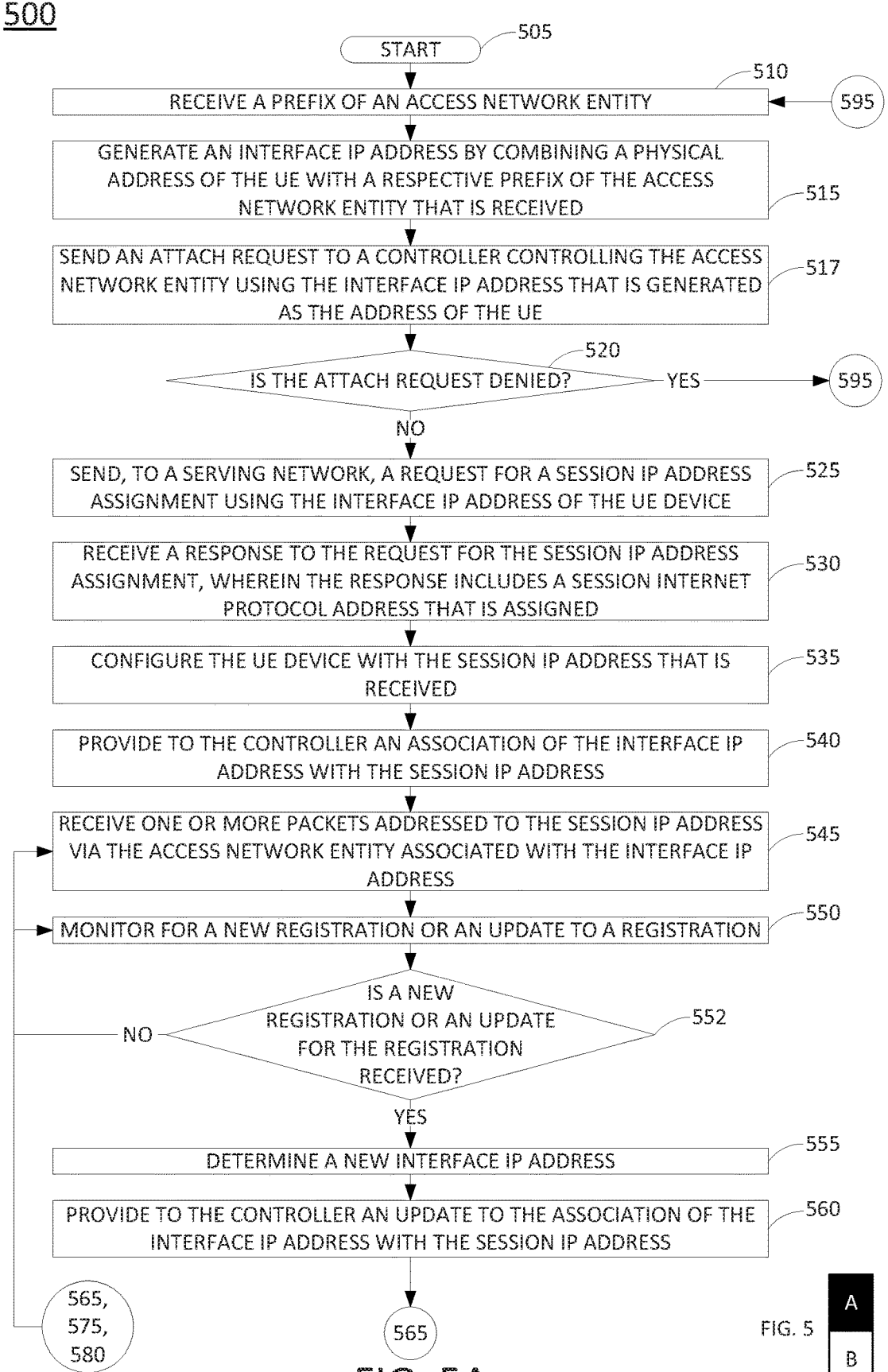
FIG. 5 (FIG. 5A and FIG. 5B) illustrates a flowchart of an example method for providing session management by an endpoint device in accordance with the present disclosure.
Figure 5A:
Figure 5B:
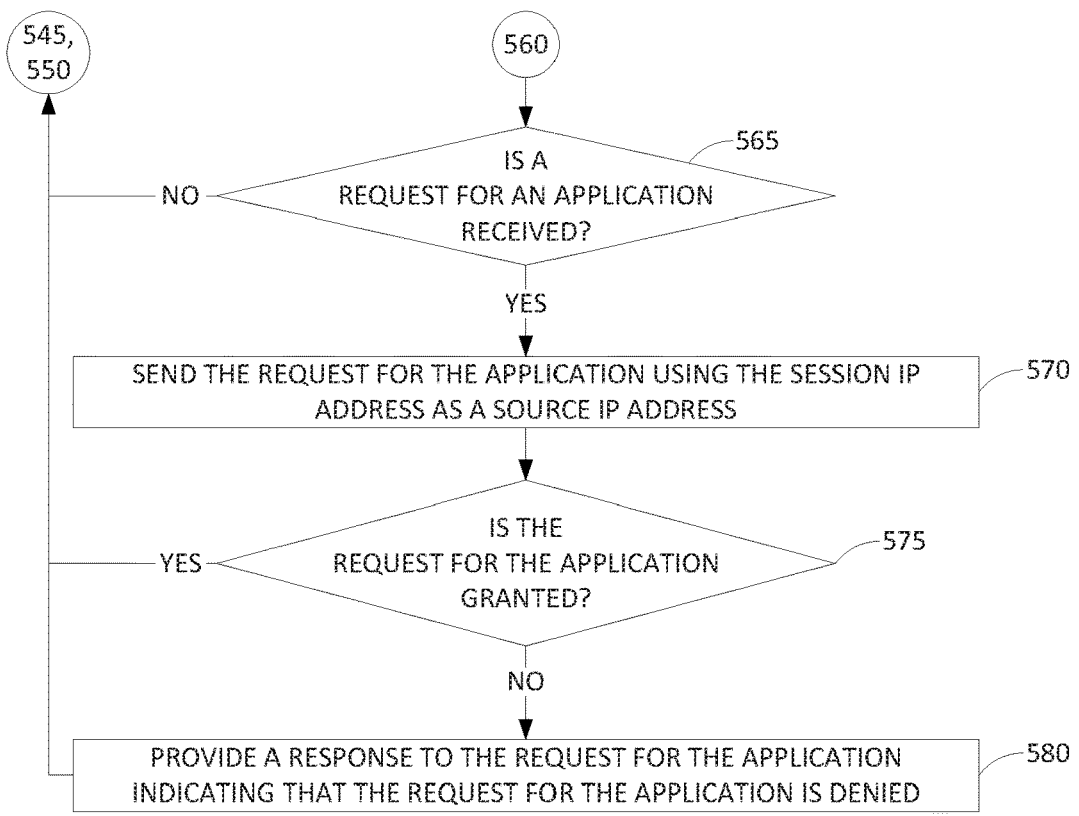
Figure 5B:
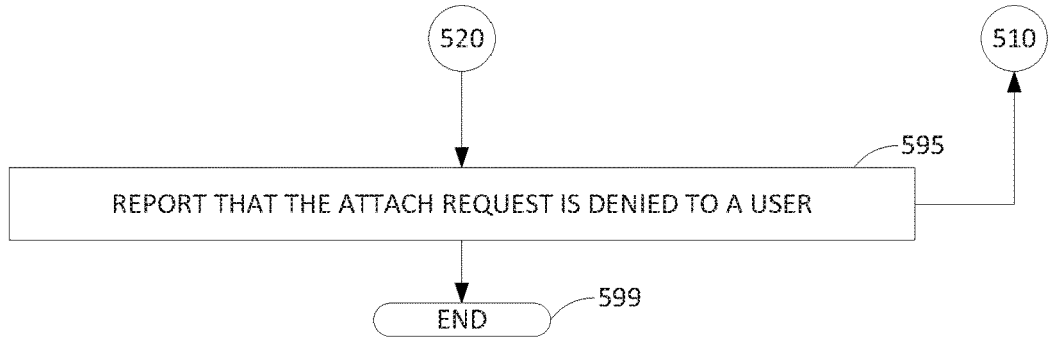

FIG. 4 depicts example device tables 494 and 499 pertaining to devices before and after a handover. Device table 494 of FIG. 4 depicts device information pertaining to devices associated with the controller 190 prior to the handover of UE device 180 from cell 182 to cell 186. Device table 499 of FIG. 4 depicts device information pertaining to devices associated with the controller 190 after the handover of UE device 180 from cell 182 to cell 186. The device table may comprise information about each device coupled to and/or in communication with (associated with) a cell, access point, or the like that is coupled to and/or controlled by a controller. Thus, as devices move in and out of communication range with an access network entity associated with controller 190, information in a device table may be updated.

As depicted in device table 494 and table 499, devices are listed in columns 408 and 409, respectively. The devices may be listed in any appropriate manner. For example, columns 408 and 409 may comprise identifiers that respectively identify each device associated with controller 190. Identifiers may comprise any appropriate identifier, such as, for example, a phone number, a device ID, a serial number, an International Mobile Subscriber Identity ("IMSI") number, a random number, a quasi-random number, a number from a sequence of numbers, a number determined by controller 190, or the like, or any appropriate combination thereof.

As shown in device table 494, UE device 176 is identified at a cell located at column 408 and row 432. For the sake of clarity, cell locations are identified herein by parenthetically bound column number and row number. For example, UE device 176 is identified at cell (408,432), UE device 178 is identified at cell (408,434), and UE device 180 is identified at cell (408, 436).

In addition, device tables may comprise profile information. Profile information may comprise information pertaining to a device and/or a person/entity associated with a device. Profile information may comprise any appropriate information describing an aspect, characteristic, preference, membership, subscription, etc. of a device and/or a person/entity associated with the device. For the sake of simplicity, specific profile information is not depicted in table 494 or table 499.

Device tables may also comprise application information. Application information may comprise information pertaining to an application, or applications, executing and/or to be executed on a device. Example applications may include sensor applications (for communicating sensor information, i.e., measured information by sensors), voice applications, video applications, data transfer applications, Internet access applications, and the like. For the sake of simplicity, specific application information is not depicted in table 494 or table 499.

Device tables may also comprise various addresses for devices, cells, access points, etc. In example configurations, controller 190 may determine an address, or addresses, for a device and an associated access network entity based on the prefix of the access network entity (entities) (e.g., the cells or APs) to which the device is coupled, other addresses in use (currently assigned), handover information, location, or the like. In an example configuration, an address may comprise a prefix that identifies an access network entity and a suffix that identifies a device. Prefixes and suffixes may be any appropriate size, or length, such as, for example, 16 bits, 32 bits, 64 bits, 128 bits, or the like. Any appropriate addressing protocol may be utilized, such as, for example, an Internet Protocol, (e.g., Internet Protocol Version 6 (IPv6), Internet Protocol Version 4 (IPv4), etc.), or the like.

As shown in FIG. 3, the prefix for cell 182 is 1.1. As shown in device table 494 and table 499 of FIG. 4, the address suffix for device 176 is 0.1 (412, 432; and 413, 433), the address suffix for device 178 is 0.2 (412, 434; and 413, 435), and the address suffix for device 180 is 0.3 (412, 436; and 413, 437). Note that the prefix the IP address shown for the cell or access point in column 308 of table 192 is combined with the address suffix of the device (i.e., 0.1 for device 176, 0.2 for device 178, and 0.3 for device 180) to obtain the various addresses shown in columns 412-421 of tables 494 or 499.

It is to be understood that the addresses illustrated herein are examples and not to be limited thereto. For example, an address suffix may comprise a host address of a device. In an example configuration, a controller may generate an address prefix and append the address prefix to a device host address to generate an address.

A controller may also maintain information regarding a location of a device. Column 410 of device table 494 and column 411 of device table 499 indicate location information. For example, the location of device 176 prior to the handover of device 180 from cell 182 to cell may be depicted at column 410, row 432 of device table 494. The location of device 178 prior to the handover of device 180 from cell 182 to cell 186 may be depicted at column 410, row 434 of device table 494. The location of device 180 prior to the handover of device 180 from cell 182 to cell 186 may be depicted at column 410, row 436 of device table 494. The location of device 176 after handover of device 180 from cell 182 to cell 186 may be depicted at column 411, row 433 of device table 499. The location of device 178 after the handover of device 180 from cell 182 to cell 186 may be depicted at column 411, row 435 of device table 499. The location of device 180 after the handover of device 180 from cell 182 to cell 186 may be depicted at column 411, row 437 of device table 499. Specific location information is not shown in table 494 or table 499 for the sake of simplicity.

A controller may maintain (e.g., in device table 494 and device table 499) an indication as to which addresses are active (in use) regarding a device and a cell/access point (an access network entity). As shown in columns 412 and 414 of device table 494, prior to the handover of device 180 from cell 182 to cell 186, device 176 may be active via cell 182 (412, 432), device 178 may be active via cell 182 (412, 434) and via access point 184 (414, 434), and device 180 may be active via cell 182 (412, 436). As shown in columns 413 and 415 of device table 499, after the handover of device 180 from cell 182 to cell 186, device 176 still may be active via cell 182 (413, 433), device 178 still may be active via cell 182 (413, 435) and via access point 184 (415, 435), and device 180 may be active via cell 186 (413, 437). Thus, the active address for device 180 changed from 1.1.0.3 prior to the handoff of device 180 from cell 182 to cell 186, to 1.2.0.3 after the handoff of device 180 from cell 182 to cell 186. Specifically, in this example, the prefix of the address of device 180 changed to indicate the new network entity associated with device 180.

Other IP addresses (not necessarily active addresses) may be maintained by a controller. For example, as depicted in device table 494, prior to the handover of device 180 from cell 182 to cell 186, an address for device 178 when associated with cell 182 may be 1.1.0.2 (416, 434), an address for device 178 when associated with cell 186 may be 1.2.0.2 (418, 434), and an address for device 178 when associated with access point 184 may be 3.0.0.2 (420, 434). Prior to the handover of device 180 from cell 182 to cell 186, an address for device 180 when associated with cell 182 may be 1.1.0.3 (416, 436), an address for device 180 when associated with cell 186 may be 1.2.0.3 (418, 436), and an address for device 180 when associated with access point 184 may be 3.0.0.3 (420, 436). As depicted in device table 499, after the handover of device 180 from cell 182 to cell 186, an address for device 178 when associated with cell 182 may be 1.1.0.2 (417, 435), an address for device 178 when associated with cell 186 may be 1.2.0.2 (419, 435), and an address for device 178 when associated with access point 184 may be 3.0.0.2 (421, 435). After the handover of device 180 from cell 182 to cell 186, an address for device 180 when associated with cell 182 may be 1.1.0.3 (417, 437), an address for device 180 when associated with cell 186 may be 1.2.0.3 (419, 437), and an address for device 180 when associated with cell 184 may be 3.0.0.3 (421, 437).

A controller may maintain the mobility status of a device associated with the controller. For example, device table 494 may comprise an indication of the mobility status of a device prior to the handover of device 180 from cell 182 to cell 186. As shown in column 422 of device table 494, device 176 is stationary (S) (422, 432), device 178 is moving (M) (422, 434), and device 180 is moving (M) (422, 436). As depicted in device table 499, after the handover of device 180 from cell 182 to cell 186, device 176 may be stationary (S) (423, 433), device 178 may be moving (M) (423, 435), and device 180 may be moving (M) (423, 437).

A controller may determine to route information based, at least in part, on operator policy, network conditions, device type, device mobility status, network load conditions, etc. For example, controller 190 may determine that information sent to and received from device 176 (e.g., stationary M2M meter) be via cell 182. This determination may be based on device 176 being camped onto cell 182, the mobility status of device 176 being stationary, and/or the load placed on the network by device 176 being low.

As another example, controller 190 may determine that voice information sent to and received from device 178 (e.g., cell phone) be via cell 186 and that video information sent to and received from device 178 be via Wi-Fi AP 184. This determination may be based on the profile associated with device 178 at a particular subscription or priority level, e.g., a "silver" level, a high network load condition being detected for cell 186, and/or a low load condition being detected on access point 184.

As another example, controller 190 may determine that information sent to and received from device 180 be via cell 182 and cell 186 in order to provide more bandwidth than would be available via a single cell. This determination may be based on cell 182 and cell 186 being co-channel cells (e.g., two eNodeBs using the same radio frequency channel), a large amount of data being downloaded by device 180 for an update, the profile associated with device 180 at a particular subscription or priority level, e.g., a higher level (e.g., "platinum" or "gold" level), and/or device 180 being a subscriber to a very high speed service.

To effectuate mobility management as described herein, a controller (e.g., controller 190), or the like, may provide prefixes to the access network entities (e.g., cells and APs) with which it is associated. For example, referring to FIG. 3, controller 190 may provide prefix values to cell 182 (prefix value of 1.1), Wi-Fi AP 184 (prefix value of 3.0), and cell 186 (prefix value of 1.2).

Each access network entity (e.g., cell or AP) may provide (e.g., broadcast) its prefix value to the devices. For example, access network entities 182, 184, and 186 may broadcast their prefixes to UE devices (e.g., devices 176, 178, and 180). The addresses may be formatted in accordance with any appropriate format and/or protocol. In an example configuration, addresses may be formatted in accordance with an IP protocol, e.g., IPv6, IPv4, or the like, or any other IP protocol variants.

A device, upon receipt of a prefix, or prefixes, may append its own host address to generate one or multiple IP addresses, depending on the number of received prefixes. Each device may then use the appropriate generated address (or addresses) when communicating with a network entity, e.g., a controller, a server, etc. The device may then send information by broadcasting to all addresses that are generated.

An access network entity may then receive the information that is broadcasted by the device. The access network entity may then process the information based on instructions received from the controller, which may be based on information in a device table and/or a network table.

The distributed controllers (e.g., controllers 190, 191, and 193) may perform mobility management functions, such as, for example, setting up tables (e.g., tables 192, 494, and 499) to capture characteristics of neighbor cells/APs, to maintain device information, including adding/removing/updating device entries with location information, mobility status, candidate IP addresses associated with current or past serving cells/APs, active IP address (or addresses), or the like, or any appropriate combination thereof. In the case of multihoming there may be multiple active IP addresses for a device (e.g., concurrent connectivity among Wi-Fi/cellular integration ISRP, multi-path TCP, etc.).

A controller may facilitate a handover by redirecting active device flows from a previous location to a new location and dynamically configuring switching/routing information (e.g., tables) on a switch/router component in order to route user traffic to/from the proper cell(s)/AP(s). For example, device 176, a power meter, may camp on to cell 182, and have packets of information to send. Device 176 may start the attach procedure to become authenticated. Device 176 also may append its host address (e.g., lower 64 bits of the full IPv6 address 0.1) to the prefix of cell 182 and may send its full IP address associated with cell 182 (i.e., 1.1.0.1) to controller 190 during the attach procedure. Controller 190 may update the device table, e.g., device table 494, to enter the device information. In this example, device 176 may be a stationary device. Thus, it may have a relatively simple table entry with only one IP address. After device 176 finishes sending packets, device 176 may detach. For example, device 176 may detach after an inactivity timer times out. Subsequently, controller 190 may delete the entries associated with device 176 from the appropriate table, or tables. The foregoing example illustrates the simplicity of non-mobile access performed in a lightweight, low-state approach. The foregoing example also illustrates scalability for simple devices.

As another example, device 178 may be used in a multipath scenario. Device 178 is under the coverage of access network entities 182 and 184. In an example configuration, device 178 may be running a high bandwidth movie download and using Multi Path-Transmission Control Protocol (MP-TCP). Device 178 has an IP address, 1.1.0.2, associated with cell 182. Additionally, device 178 has an IP address, 3.0.0.2, associated with the Wi-Fi AP 184. The controller may discover device the IP addresses of device 178 through its allocation (e.g., duplicate address detection (DAD)). Controller 190 may add an entry to the device information table for device 178 as illustrated herein. Controller 190 may mark both IP addresses associated with access network entities 182 and 184 as active, as shown in device table 494 columns 412 and 414. Controller 190 now may provide intelligence for use of the duplicate paths. Controller 190 may resolve host addresses for device 178 such that inbound load is distributed via 182 or 184, as appropriate.

As another example, device 180 may be moving away from access network entity 182 toward access network entity 186, and handover may occur when appropriate handover conditions are met. As described herein, device 180 may have three valid addresses, 1.1.0.3, 1.2.0.3, 3.0.0.3. Controller 190 may update the entries associated with device 180 to reflect the handover from access network entity 182 to access network entity 186. After the handover, flows that are ongoing for device 180 through the access network entity 182 may now be sent to access network entity 186, thus alleviating the need for mobility protocols such as, for example, Identifier-Locator Network Protocol (ILNP), Locator Identifier Separation Protocol-Mobile Node (LISP-MN), or the like.

As described above, the mobility management may be performed in a connectionless manner. However, an application layer may rely on static IP addressing mechanisms to provide services. For example, Internet applications may require communication between the UE device and an application server to be established via a constant communication session. In one example, a user may subscribe to a stock market update from an application server. The application server may track changes and provide updates to subscribing UE devices. Constant communication sessions may then be established between the application server and the UE devices that subscribed to the update. The communication between the UE devices and the application server relies on the UE devices having static session layer addresses.

Returning to the session management, the method of the present disclosure extends the connectionless procedure to management of sessions. That is, in addition to the connectionless method of mobility management (as described above), the method of the present disclosure also performs connectionless session management.

The session layer IP address of the present disclosure may be formed as a tuple. In one example, the tuple comprises the IP address to be used for the service. In another example, the tuple comprises the IP address to be used for the service along with one or more of: a port number for the service and an identification of an application protocol for the service.

The session layer address is assigned by an entity of a serving network and is a global address that does not change when a device changes a point of attachment. In one embodiment, the assigning of the session layer address may be performed via a controller, e.g., an SDN controller that manages a pool of service IP addresses. In one embodiment, the assigning of the session layer address may be performed by an enhanced Dynamic Host Configuration Protocol (DHCP) server of a serving network. In one embodiment, the assigning of the session layer address may be via a protocol enhanced over a mobile IP protocol and assigned by a foreign agent.

In one embodiment, the session layer address is formed based on information provided, by the UE device, to the entity assigning the session layer IP address. For instance, a UE device may send a session IP address assignment request by invoking an Address Assignment Request (AAR) procedure. The UE device may then include additional characteristics related to an application when it sends the session IP address assignment request via the AAR procedure. Then, the network entity that receives the session IP address assignment request (e.g., the foreign agent, the SDN controller or the DHCP server) may create the tuple that forms the includes the session layer IP address using information received from the UE device, e.g., using characteristics related to an application received from the UE device. The network entity is then able to assign a session layer IP address that is appropriate for the application.

In one embodiment, the method of the present disclosure provides session management via an enhanced Dynamic Host Configuration Protocol (DHCP) server. The controllers 190, 191 and 193 are communicatively coupled to the enhanced DHCP servers 199a and 199b.

In one embodiment, a designated DHCP server may be stored on a Subscriber Identity Module (SIM) card of the UE device. The designated DHCP server is the DHCP server to which the UE device should address session IP address requests. In one embodiment, a designated DHCP server address may be stored in a non-volatile memory of the UE device. In one embodiment, a designated DHCP server address may be provided to a UE device by the controller. In one embodiment, the controller which accepts and processes an attachment request from the UE device provides the designated DHCP to the UE device as part of the attachment procedure. In one embodiment, the designated DHCP server is determined based on a type of service or application. For example, one DHCP server may be designated for voice traffic while another DHCP server may be designated for video streaming.

In order to request for a session IP address assignment, the UE devices communicate with a DHCP server 199a or 199b using their interface IP address, e.g., UE device 176 may send 1.1.0.1. Similarly, UE device 178 may send 1.1.0.2 and 3.0.0.2 to be assigned a session IP address for an application accessed via cell 182 and an application accessed via Wi-Fi AP 184, respectively. UE device 180 may send 1.1.0.3 to be assigned a session IP address to access a service via cell 182.

Returning to FIG. 4, columns 408-423 were described above in relation to mobility management. Columns 424 and 425 are used for session management in accordance with the present disclosure. Table 494, column 424 contains session IP addresses associated with the UE devices 176, 178 and 180 prior to the handover of UE device 180 from cell 182 to cell 186. Similarly, table 499, column 425 contains session IP addresses associated with the UE devices 176, 178 and 180 after the handover of UE device 180 from cell 182 to cell 186. The session IP addresses in columns 424 and 425 are identical, while the active interface IP address of UE device 180 has changed from 1.1.0.3 to 1.2.0.3. Thus, the handover for UE device 180 is completed while maintaining the same session IP address (i.e., 10.10.0.3).

The UE devices may move among various cells and/or among various radio access technologies. The controller, i.e., controller 190, is tasked with maintaining an association between the session layer IP addresses and the interface IP addresses while the UE devices move among the various cells and/or radio access technologies.

In addition, the controller is responsible for providing updates to network switches, routers and gateways on how to reach the session layer IP address through the interface IP address. For example, when a device moves to a new location and registers (or updates its registration), the updating of the registration serves as an update to the interface IP address. The controller then updates the association between the session layer IP addresses and the interface IP address in accordance with the latest registration or update. The controller then provides updates to the network switches, routers and gateways on how to reach the new interface IP address, and on how to reach the session layer IP address (or addresses) through the new interface IP address.

FIG. 5 (presented as FIG. 5A and FIG. 5B) illustrates a flowchart of an example method 500 for providing session management by a device, e.g., UE device, in accordance with the present disclosure. In one embodiment, the method 500 may be implemented in user endpoint (UE) device 176, 178, or 180, or the processor 702 as described in FIG. 7. The method 500 starts in step 505 and proceeds to step 510.

In step 510, the processor receives a prefix of an access network entity, e.g., a cell or a Wi-Fi AP. For example, a UE 176, 178 or 180 receives a prefix for an access point 184 or cell 182 or cell 186. For instance, in FIG. 3, an example prefix for the access point 184 is 3.0, for cell 182 is 1.1, and for cell 186 is 1.2.

In step 515, the processor generates an interface IP address by combining a physical address of the UE with the prefix of the access network entity that is received. For example, the UE 176 may generate an interface IP address for communicating via cell 182 as 1.1.0.1. The last portion (0.1) represents the physical address while the first portion (1.1) represents the prefix received by the UE from cell 182.

In step 517, the processor sends an attach request to a controller controlling the access network entity using the interface IP address that is generated as the address of the UE. For example, the attach request sent to controller 190 for UE 176 for attachment to cell 182 may use 1.1.0.1 as a source address (address of the UE). Similarly, the attach request sent to controller 190 for UE 180 for attaching to cell 182 may use 1.1.0.3 as a source address for UE 180.

In step 520, the processor determines if the attach request is denied. If the attach request is denied, the method proceeds either to step 517 to send the attach request again or to step 595 to report to a user that the attach request is denied. If the attach request is accepted, the method proceeds to step 525.

In step 525, the processor sends to a serving network a request for a session IP address assignment using the interface IP address of the UE device. The request for the session IP address assignment is sent when the attach request is accepted by the controller that handles attachment requests for the access network entity.

In one embodiment, the request for the session IP assignment is sent to a controller that manages a pool of session IP addresses. In one embodiment, the request for the session IP assignment is sent to a foreign agent associated with the serving network. In one embodiment, the request for the session IP assignment is sent to an enhanced Dynamic Host Configuration Protocol (DHCP) server of the serving network. For example, when the UE device 176 is successfully attached to the cell, UE 176 may invoke an enhanced DHCP procedure by sending a request for a session IP address assignment to a DHCP server 199a or 199b using its interface IP address (i.e., 1.1.0.1) as the source for the request.

In one embodiment, an identification of the enhanced DHCP server to which the request for the session IP address assignment is to be directed may be received from the controller. In one embodiment, an identification of the enhanced DHCP server to which the request for the session IP address assignment is to be directed is provided to the UE device in a response to the attach request. In one embodiment, an identification of the enhanced DHCP server to which the request for the session IP address assignment is to be directed is obtained from a Subscriber Identity Module (SIM) card of the UE device. In one embodiment, an identification of the enhanced DHCP server to which the request for the session IP address assignment is to be directed is obtained from a non-volatile memory of the UE device.

In one embodiment, the request for the session IP address assignment comprises one or more characteristics related to an application. The characteristics related to an application may be used to assign a session IP address that is proper for the application. In one embodiment, the characteristics related to an application may also be used for identifying a proper range for ports and a proper range for an identification for the application.

In step 530, the processor receives a response to the request for the session IP address assignment, wherein the response includes a session internet protocol address that is assigned. In one embodiment, the response to the request for the session IP address assignment is received as a tuple. In one embodiment, the tuple comprises a session IP address for a service. In one embodiment, the tuple comprises the session IP address for a service along with one or more of: a port number for the service and an identification of an application protocol for the service. For an illustrative example, UE 176 may receive a session IP address of 10.10.0.1, UE 178 may receive a session IP address of 10.10.0.2, and UE 180 may receive a session IP address of 10.10.0.3, as shown in FIG. 4.

In step 535, the processor configures the UE device with the session IP address that is received. For example, for each session IP address that is received, the processor configures the device to use the respective session IP address.

In step 540, the processor provides to the controller an association of the interface IP address with the session IP address. For example, the controller that handles packets addressed to the session IP address needs to be notified, such that packets from applications that use the session IP address can reach the UE via the interface IP address.

In step 545, the processor receives one or more packets addressed to the session IP address via the access network entity associated with the interface IP address. The processor sends one or more packets for the application using the session IP address.

In step 550, the processor monitors for a new registration or an update to a registration. In step 552, the processor determines if either a new registration or an update to the registration is received. If no new registration or update is received, the processor returns to step 545 and/or 550 to continue sending/receiving packets and monitoring for changes. Otherwise, the processor proceeds to step 555.

In step 555, the processor determines a new interface IP address. For example, if the UE device moved and an update to a registration is performed, the access network entity (e.g., cell or Wi-Fi AP) serving the UE would now be different. Thus, the prefix of the access network entity needs to be updated to replace the prefix of the old access network entity with the prefix of the new access network entity. For example, if UE device 180 moved from cell 182 to cell 186, the prefix of cell 182 (1.1) is replaced by the prefix of cell 186 (1.2). The old interface IP address of UE device 180 is 1.1.0.3. Then, the interface IP address of UE device 180 becomes 1.2.0.3

In step 560, the processor provides to the controller an update to the association of the interface IP address with the session IP address. For example, the UE provides the new interface IP address as being the interface IP address associated with the session IP address.

In step 565, the processor determines if a request for an application is received. For instance, a UE may receive a request from a user for downloading Google maps. For example, the request may be received via an interface for user interaction. In another example, the UE may receive a request for receiving stock updates from an application server (e.g., a push of a stock update). If no request for an application is received, the UE proceeds to step 545 and/or 550. Otherwise, the processor proceeds to step 570.

In step 570, the processor sends the request for the application using the session IP address as a source IP address. For example, UE 180 may send a request for a Google map using 10.10.0.3 as its session IP address.

In step 575, the processor determines if the request for the application is granted. If the request is granted, the processor may then proceed to step 545 and/or 550. Otherwise, the processor proceeds to step 580.

In step 580, the processor provides a response to the request for the application indicating that the request for the application is denied. The method then proceeds to step 545 and/or 550.

In step 595, the processor reports that the attach request is denied to a user. The method then either returns to step 510, or proceeds to step 599 to end the process.

Figure 6A:
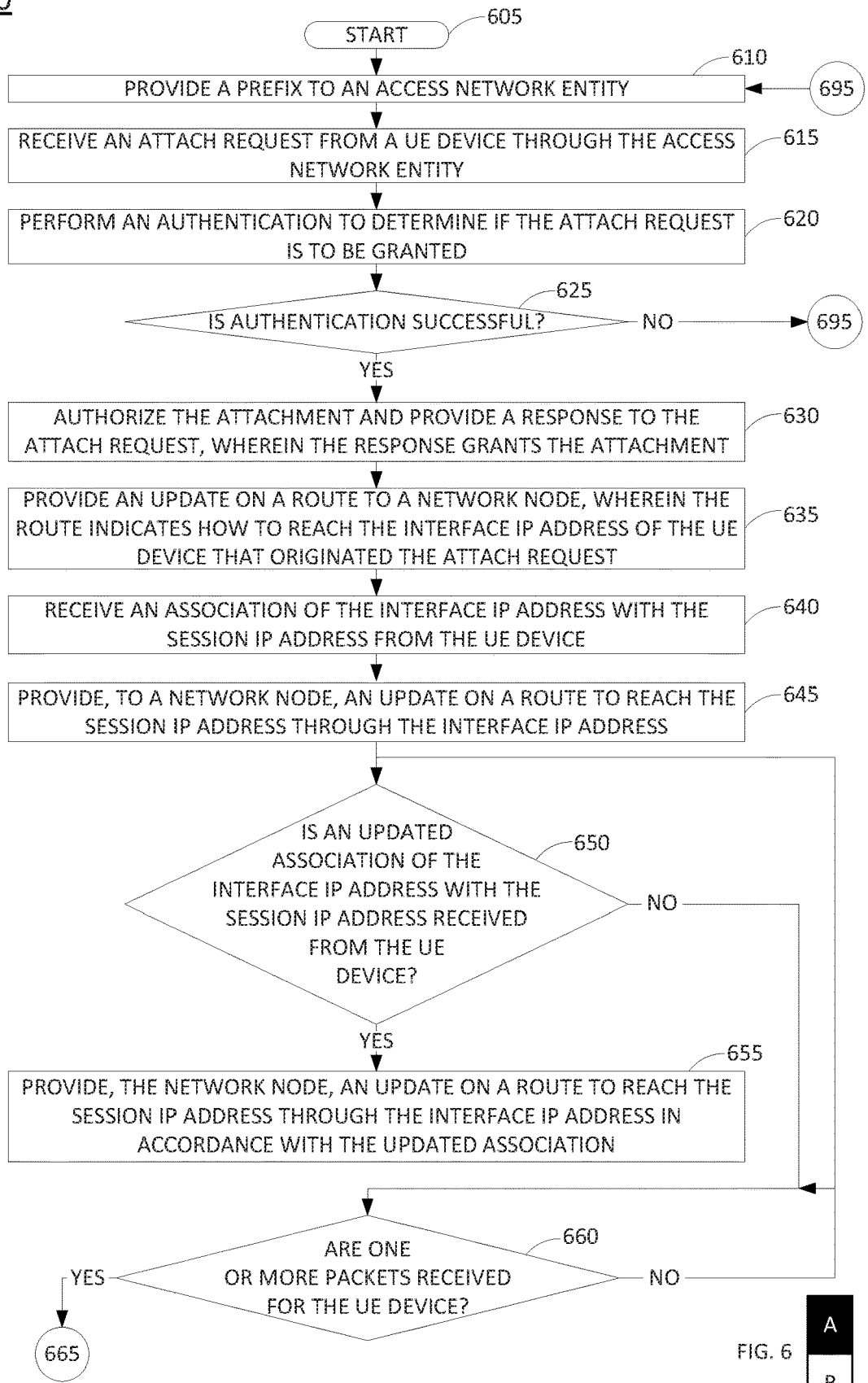
FIG. 6 (FIG. 6A and FIG. 6B) illustrates a flowchart of an example method for providing session management by a controller in accordance with the present disclosure.
Figure 6B:
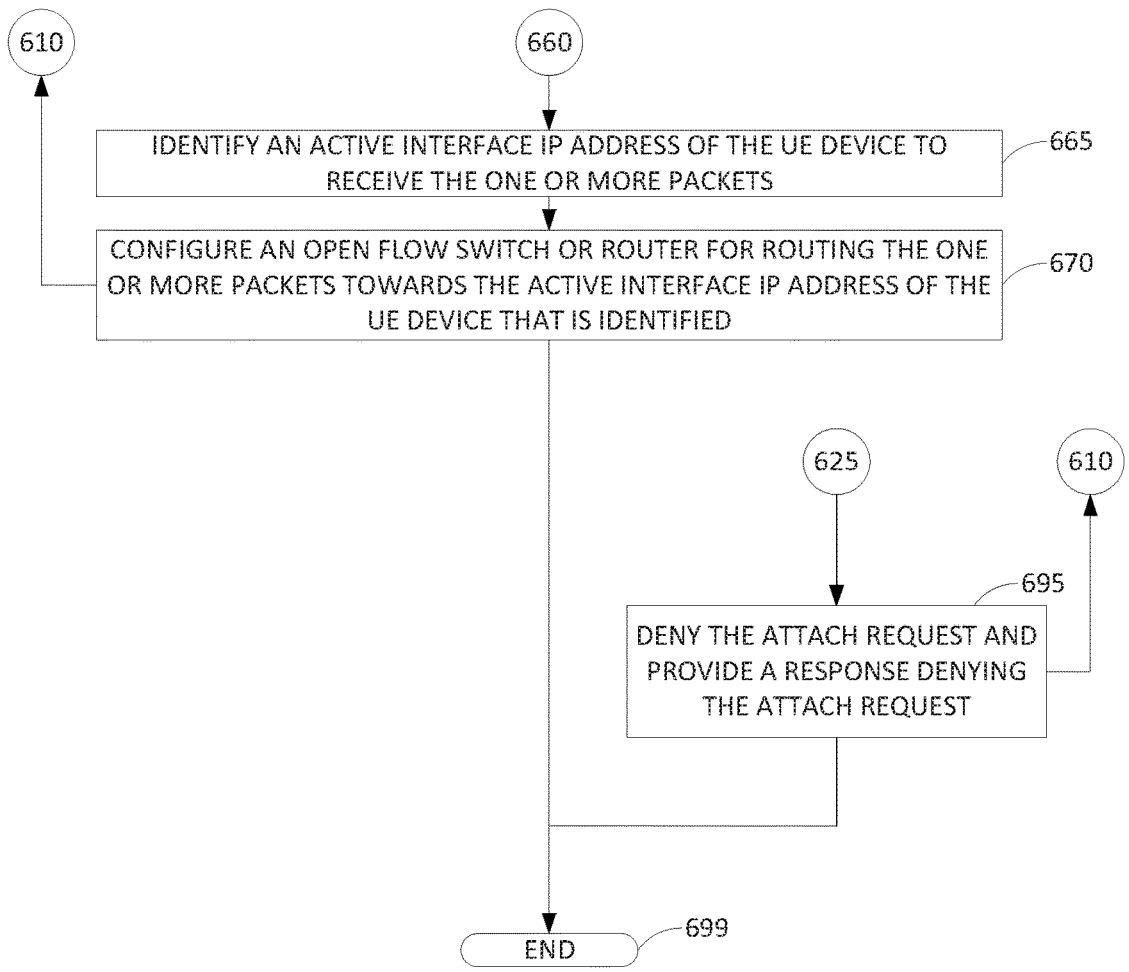

FIG. 6 (presented as FIG. 6A and FIG. 6B) illustrates a flowchart of an example method 600 for providing session management, e.g., by a controller, in accordance with the present disclosure. In one embodiment, the method 600 may be implemented in an SDN controller of a network, e.g., a network of a communications service provider. The method 600 starts in step 605 and proceeds to step 610.

In step 610, the processor provides a prefix to an access network entity. For example, a controller 190 may provide a prefix to a cell site 182 or 186, or to Wi-Fi AP 184.

In step 615, the processor receives an attach request from a UE device through the access network entity. For example, controller 190 may receive, through cell 182, an attach request from UE 178 for attaching to cell 182. Similarly, the controller 190 may receive, through Wi-Fi AP 184, an attach request from UE 178 for attaching to Wi-Fi AP 184.

In step 620, the processor performs an authentication to determine if the attach request is to be granted. For example, the authentication may be based on services to which the user has subscribed.

In step 625, the processor determines whether the authentication is successful. If the authentication is successful, the processor proceeds to step 630. Otherwise, the processor proceeds to step 695.

In step 630, the processor authorizes the attachment and provides a respond to the attach request, wherein the response grants the attachment. In one embodiment, the response to the attach request comprises a preferred enhanced Dynamic Host Configuration Protocol (DHCP) server.

In step 635, the processor provides an update on a route to a network node (e.g., to a router, a switch and/or a gateway), wherein the route indicates how to reach the interface IP address of the UE device. For example, UE device 176 may be reached via interface IP address 1.1.0.1, UE device 178 may be reached via interface IP addresses 1.1.0.2 and 3.0.0.2, and UE device 180 may be reached via interface IP address 1.1.0.3.

In step 640, the processor receives an association of the interface IP address with the session IP address from the UE device. For example, the UE device 176, 178 or 180 sends, to the controller 190, its own interface IP address with the session IP address it received from the DHCP server.

In step 645, the processor provides to a network node (e.g., the router, the switch and/or the gateway), an update on a route to reach the session IP address through the interface IP address.

In step 650, the processor determines whether an updated association of the interface IP address with the session IP address is received from the UE device. If an updated association is received the processor proceeds to step 655. Otherwise, the method proceeds to step 660.

In step 655, the processor provides, the network node, an update on a route to reach the session IP address through the interface IP address in accordance with the updated association. For example, routers, switches and gateways are provided routing information on how to reach the session IP address through the interface IP address.

In step 660, the processor determines whether one or more packets are received for the UE device. If no packet is received, the processor proceeds to steps 650 and/or step 660. Otherwise, the processor proceeds to step 665.

In step 665, the processor identifies an active interface IP address of the UE device to receive the one or more packets. For example, for device 180, the controller may identify the active interface IP address as being 1.1.0.3. In other words, the interface IP address associated with the session IP address 10.10.0.3 is identified as being 1.1.0.3.

In step 670, the processor configures an open flow (OF) switch or router for routing the one or more packets towards the active interface IP address of the UE device that is identified. For example, the packets that are received for the UE device 180 are to be routed using the IP address 1.1.0.3 through cell 182. The packets are then routed to the UE device by the OF switch or router in accordance with the configuration. The method then either returns to step 610 or to step 699 to end the process. It is important to note that the OF may be already configured correctly. In which case, the configuration may simply be verified by comparing a latest known active interface IP address to the latest configuration of the OF.

As described above, the session IP address does not change when the UE device physically moves from one location to another. The Google server or stock update server, described above, may continue providing updates using the same session IP address as the destination. The controller receives updates from the UE device regarding any new association between the interface IP addresses and session IP addresses (described in step 650 above). When, the controller receives packets, it performs a lookup to determine which interface IP address is active (described in step 665 above), configures the OF switch/router (described in step 670 above) to route the packets via the active interface IP address. The packets then reach via the OF switch/router through the latest active interface IP address.

In step 695, the processor denies the attach request and provides a response denying the attach request. The method then either returns to step 610, or to step 699 to end the process.

To illustrate the interworking between methods 500 and 600 described above, suppose UE 180 shown in FIG. 1 (which has a suffix of 0.3) registers at cell 182 (prefix of 1.1) and then the user physically moves towards cell 186 (prefix of 1.2) via path 195. Suppose UE 180 has registered at a stock update server to get push updates for any changes of a stock, e.g., company ABC, for more than $1. The stock update server then needs to continue providing the updates as UE 180 moves around. The interworking of methods 500 and 600 proceeds as follows. First, UE 180 is served by cell 182 with its interface IP address being 1.1.0.3 and session IP address being 10.10.0.3 as shown in FIG. 4, device table 494. The stock update server uses the session IP address (e.g., 10.10.0.3) as the destination IP address when it pushes updates towards UE 180. The controller performs step 665 to identify an active interface IP address of the UE 180 for receiving one or more packets for the stock update. For example, the controller identifies 1.1.0.3 as being the active interface IP address. The controller then performs step 670 to configure an open flow (OF) switch or router for routing the one or more packets towards the active interface IP address (e.g., 1.1.0.3).

As UE 180 moves towards cell 186, UE 180 is handed over to cell 186. UE 180 performs step 555 to determine a new interface IP address (e.g., 1.2.0.3) and sends an update. UE 180 then performs step 560 to provide to the controller an update to the association of the interface IP address with the session IP address. The update indicates that the active interface IP address is 1.2.0.3 for the session address 10.10.0.3. The controller determines whether an updated association of the interface IP address with the session IP address is received from UE 180 and provides the network nodes an update on a route to reach the session IP address (e.g., 10.10.0.3) through the new interface IP address (e.g., 1.2.0.3). If one or more packets are received for UE 180, the controller performs step 665 to identify an active interface IP address of the UE 180 (e.g., 1.2.0.3) to receive the one or more packets. The controller then performs step 670 to configure an OF switch or router for routing the one or more packets towards the active interface IP address (e.g., 1.2.0.3) of the UE device that is identified. For example, after the handover is completed, the stock update server continues to use the session IP address 10.10.0.3 for pushes towards UE 180. In other words, the controller is used for identifying the active interface IP address through which packets with destination address indicating the session IP address reach the UE.

The method of the present disclosure provides several advantages. As described above, the method provides two separate types of addresses for a UE device, one type to be used for physical attachment of the device to a network as described above (i.e., interface IP address), and another type for the application layer to provide application services (i.e., session layer IP addresses). Hence, the method of the present disclosure operates without the need for PDP contexts. The method of the present disclosure eliminates complex interactions between mobility management and session management procedures, and provides connectionless wireless access networks. Reducing the complexity of the procedures performed by UE devices may also improve energy consumption by the UE devices.

Moreover, as described above, the session layer IP addresses of the present method are not assigned by the P-GW. Rather, the session layer IP address is assigned by an entity of a serving network, e.g., a controller, a foreign agent, etc. As such, a common session layer IP address is assigned by the entity of a serving network. The common session layer IP address enables the session management to seamlessly continue, unaffected, as the UE device moves to a coverage area of another P-GW or another radio access network technology. For example, if a UE device moves to an area where the application is better served on a Wi-Fi network, an ongoing session may be continued as the UE device attaches to a Wi-Fi AP and detaches from another access network, e.g., 5G access technology, LTE, etc.

The methods of the present disclosure may be implemented without impacting layers 4-7 of the Open Systems Interconnection (OSI) protocol stack. The layers 4-7 comprise the transport layer, session layer, presentation layer and application layers, respectively. The method may be used to support connection oriented sessions (i.e., Transmission Control Protocol (TCP) or Stream Control Transmission Protocol (SCTP) sessions) as well as connectionless sessions (i.e., User Datagram Protocol (UDP) or Real-Time Transport Protocol (RTP) sessions).

Figure 7:
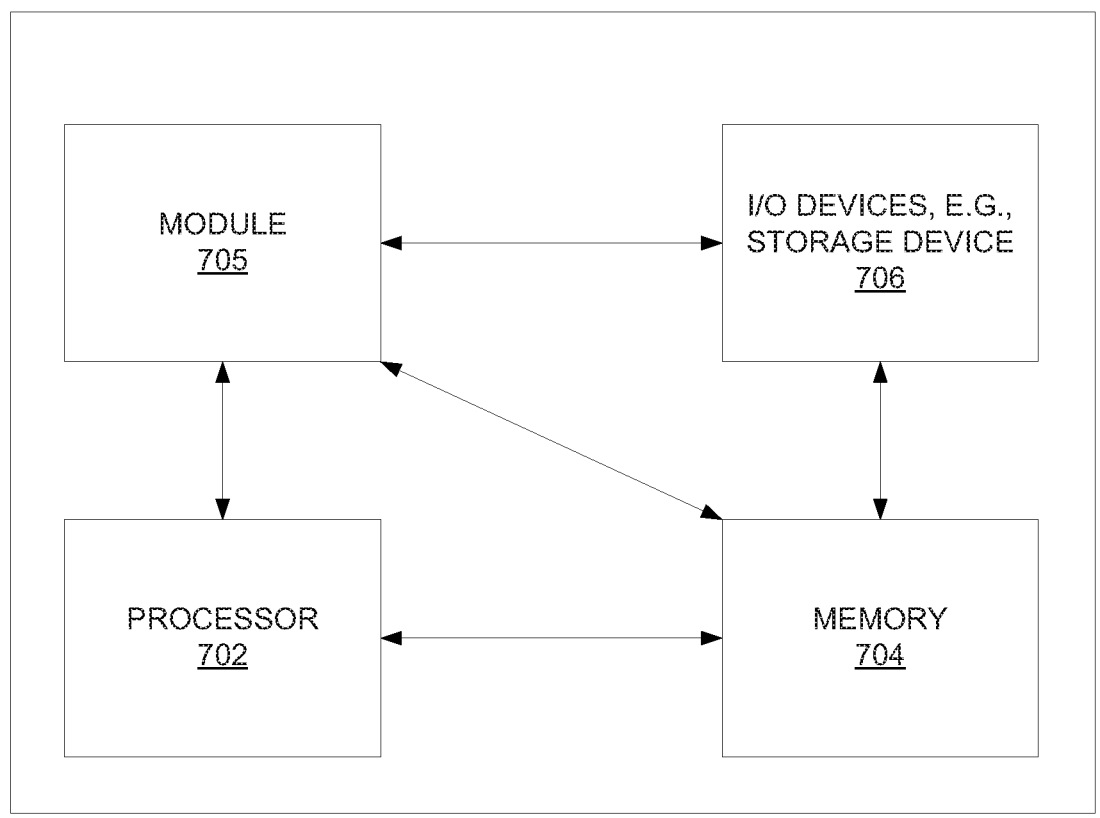
FIG. 7 depicts a high-level block diagram of a computer suitable for use in performing the functions described herein.

In one embodiment, the UE device may be deployed as a hardware device embodied as a dedicated device (e.g., the dedicated computer 700 as illustrated in FIG. 7). In one embodiment, the UE device is configured to perform the methods and functions described herein (e.g., the method 500). For example, the UE device of the present disclosure is for sending to a serving network a request for a session internet protocol address assignment using an interface internet protocol address of the user endpoint device, configuring the user endpoint device with the session internet protocol address when a session IP address that is assigned is received as a response to the request for the session internet protocol address assignment is received, wherein the response includes a session internet protocol address that is assigned, providing to a controller an association of the interface internet protocol address with the session internet protocol address, and receiving one or more packets addressed to the session internet protocol address, wherein the one or more packets are received via an access network entity associated with the interface internet protocol address of the user endpoint device.

In one embodiment, the core network 128 may include a controller, and a database. For example, the controller may be deployed as a hardware device embodied as a dedicated server (e.g., the dedicated computer 700 as illustrated in FIG. 7). In one embodiment, the controller is configured to perform the methods and functions described herein (e.g., the method 600). For example, the controller is for receiving an association of an interface internet protocol address with a session internet protocol address from a user endpoint device, wherein the user endpoint device has been granted an attachment via the interface internet protocol address prior to receiving the association, providing to a network node, an update on a route to reach the session internet protocol address through the interface internet protocol address, identifying an active interface internet protocol address of the user endpoint device to receive the one or more packets, when one or more packets are received for the user endpoint device, and configuring an open flow switch or router for routing the one or more packets towards the active interface internet protocol address of the user endpoint device that is identified.

It should be noted that the network 100 may include additional networks and/or elements that are not shown to simplify FIG. 1. For example, the access networks and the core network of FIG. 1 may include additional network elements (not shown), such as for example, base stations, border elements, gateways, firewalls, routers, switches, call control elements, various application servers, open flow servers, and the like.

In addition the various types of data may be stored in any number of databases. For instance, various databases, e.g., a separate database for device tables, network conditions, customer subscription profiles, etc. may be used. In addition, the various types of data may be stored in a cloud storage. In other words, the network service provider may implement the service for providing session management of the present disclosure by utilizing distributed network entities, controllers, DHCP servers, etc., and various data stored in a cloud storage and/or a centralized server.

In addition, although not specifically specified, one or more steps, functions or operations of method 500 or method 600 may include a storing, displaying and/or outputting step as required for a particular application. In other words, any data, records, fields, and/or intermediate results discussed in the method can be stored, displayed and/or outputted either on the device executing the method or to another device, as required for a particular application.

Furthermore, steps, blocks, functions or operations in FIG. 5 or FIG. 6 that recite a determining operation or involve a decision do not necessarily require that both branches of the determining operation be practiced. In other words, one of the branches of the determining operation can be deemed as an optional step. Moreover, steps, blocks, functions or operations of the above described methods 500 or 600 can be combined, separated, and/or performed in a different order from that described above, without departing from the example embodiments of the present disclosure.

It should be noted that the above described methods 500 or 600 can be deployed with various different implementations. For example, the UE for sending to a serving network a request for a session internet protocol address assignment using an interface internet protocol address of the user endpoint device, configuring the user endpoint device with the session internet protocol address when a response (including session IP address that is assigned) to the request for the session internet protocol address assignment is received, providing to a controller an association of the interface internet protocol address with the session internet protocol address, and receiving one or more packets addressed to the session internet protocol address, wherein the one or more packets are received via an access network entity associated with the interface internet protocol address of the user endpoint device may be via a dedicated computer. In another example, the controller for receiving an association of an interface internet protocol address with a session internet protocol address from a user endpoint device, wherein the user endpoint device has been granted an attachment via the interface internet protocol address prior to receiving the association, providing to a network node, an update on a route to reach the session internet protocol address through the interface internet protocol address, identifying an active interface internet protocol address of the user endpoint device to receive the one or more packets, when one or more packets are received for the user endpoint device, and configuring an open flow switch or router for routing the one or more packets towards the active interface internet protocol address of the user endpoint device that is identified may be via a dedicated computer.

In one example, the present method for providing session management of the present disclosure is implemented via a dedicated server. For example, in one embodiment, the method of the present disclosure is implemented via a dedicated controller, e.g., controller 190, 191 or 193, for providing the session management to user endpoint device, e.g., to UE 176, 178 or 180. The dedicated controller may be communicatively coupled to a dedicated database server, e.g., a database server for storing a network table, e.g., network table 192. The dedicated controller is operated and managed by a network service provider. For example, the network service provider may operate one or more communications networks to provide one or more services such as telephony services, cellular services, data services (e.g., data access and transfer services, Internet access services, and the like), multimedia delivery services (e.g., multimedia programming delivery services such as movies, videos, music and the like), and the like.

In another embodiment, the present method for receiving session management, e.g., method 500, can be provided via a dedicated user endpoint device, e.g., UE 176, 178 or 180. The dedicated UE device receives wireless services via one or more communications networks to receive one or more services such as telephony services, cellular services, data services (e.g., data access and transfer services, Internet access services, and the like), multimedia delivery services (e.g., multimedia programming delivery services such as movies, videos, music and the like), and the like.

As such, the present disclosure provides at least one advancement in the technical field of receiving session management that is connectionless. This advancement improves the ability of the user to receive applications and services without a need for coupling physical internet protocol addresses (i.e., interface IP addresses) to session level internet protocol addresses (i.e., session IP addresses). The user may change his/her location, thereby changing the interface IP address while continuing to receive packets via a constant (same) session IP address. The controller is tasked with the responsibility for determining a latest active address that corresponds to a session internet protocol address. The session may then be maintained in a connectionless manner, thereby improving session management for application layer communication.

FIG. 7 depicts a high-level block diagram of a computer suitable for use in performing the functions described herein. As depicted in FIG. 7, the system 700 comprises one or more hardware processor elements 702 (e.g., a central processing unit (CPU), a microprocessor, or a multi-core processor), a memory 704, e.g., random access memory (RAM) and/or read only memory (ROM), a module 705 for providing session management, and various input/output devices 706 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method 500 or method 600 as discussed above is implemented in a distributed or parallel manner for a particular illustrative example, i.e., the steps of the above method 500 or method 600, or each of the entire method 500 or method 600 is implemented across multiple or parallel computers, then the computer of this figure is intended to represent each of those multiple computers.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computer or any other hardware equivalents, e.g., computer readable instructions pertaining to the method(s) discussed above can be used to configure a hardware processor to perform the steps, functions and/or operations of the above disclosed method 500 or 600.

In one embodiment, instructions and data for the present module or process 705 for providing session management (e.g., a software program comprising computer-executable instructions) can be loaded into memory 704 and executed by hardware processor element 702 to implement the steps, functions or operations as discussed above in connection with the illustrative method 500 or method 600. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 705 for providing session management (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described example embodiments, but should be defined only in accordance with the following claims and their equivalents.

What is claimed is:

1. A method, comprising:
    sending, via a processor of a user endpoint device, to a serving network, a request for a session internet protocol address assignment using an interface internet protocol address of the user endpoint device, wherein the interface internet protocol address of the user endpoint device is generated by combining a physical address of the user endpoint device with a prefix of an access network entity that is received from the access network entity;
    configuring, via the processor, the user endpoint device with a session internet protocol address that is assigned when a response to the request for the session internet protocol address assignment is received, wherein the response includes the session internet protocol address that is assigned;
    providing, via the processor, to a controller an association of a session layer internet protocol address with the session internet protocol address; and
    receiving, via the processor, one or more packets addressed to the session internet protocol address, wherein the one or more packets are received via the access network entity associated with the session layer internet protocol address of the user endpoint device.

2. The method of claim 1, wherein the sending the request for the session internet protocol address assignment is performed when a response is received for an attach request indicating that the attach request is accepted, wherein the attach request is sent to a controller that controls the access network entity, wherein the attach request is sent using the session layer internet protocol address of the user endpoint device.

3. The method of claim 1, wherein the prefix of the access network entity is received in a broadcast from the access network entity.

4. The method of claim 1, further comprising:
    monitoring, via the processor, for a new registration or for an update to a registration;
    determining, via the processor, a new session layer internet protocol address when the new registration or the update to the registration is received; and
    providing, via the processor, to the controller an update to the association of the session layer internet protocol address with the session internet protocol address.

5. The method of claim 1, further comprising:
    determining, via the processor, whether a request for an application is received; and
    sending, via the processor, the request for the application using the session internet protocol address as a source internet protocol address, when the request for the application is received.

6. The method of claim 1, wherein the request for the session internet protocol assignment is sent to a controller that manages a pool of session internet protocol addresses for the serving network.

7. The method of claim 1, wherein the request for the session internet protocol assignment is sent to a foreign agent associated with the serving network.

8. The method of claim 1, wherein the request for the session internet protocol assignment is sent to an enhanced dynamic host configuration protocol server of the serving network.

9. The method of claim 8, wherein an identification of the enhanced dynamic host configuration protocol server to which the request for the session internet protocol address assignment is to be directed is received from a controller that controls a cell or an access point.

10. The method of claim 8, wherein an identification of the enhanced dynamic host configuration protocol server to which the request for the session internet protocol address assignment is to be directed is received in a response to an attach request.

11. The method of claim 8, wherein an identification of the enhanced dynamic host configuration protocol server to which the request for the session internet protocol address assignment is to be directed is obtained from a memory of the user endpoint device.

12. The method of claim 11, wherein the memory comprises a memory on a subscriber identity module card of the user endpoint device.

13. The method of claim 11, wherein the memory comprises a non-volatile memory of the user endpoint device.

14. The method of claim 1, wherein the request for the session internet protocol address assignment comprises one or more characteristics related to an application.

15. The method of claim 1, wherein the response to the request for the session internet protocol address assignment is received as a tuple.

16. The method of claim 15, wherein the tuple comprises the session internet protocol address that is assigned for a service, wherein the tuple further comprises one or more of: a port number for the service or an identification of an application protocol for the service.

17. A non-transitory computer-readable storage device storing a plurality of instructions which, when executed by a processor of a user endpoint device, cause the processor to perform operations, the operations comprising:
- sending to a serving network a request for a session internet protocol address assignment using a session layer internet protocol address of the user endpoint device, wherein the session layer internet protocol address of the user endpoint device is generated by combining a physical address of the user endpoint device with a prefix of an access network entity that is received from the access network entity;
- configuring the user endpoint device with a session internet protocol address that is assigned when a response to the request for the session internet protocol address assignment is received, wherein the response includes the session internet protocol address that is assigned;
- providing to a controller an association of the session layer internet protocol address with the session internet protocol address; and
- receiving one or more packets addressed to the session internet protocol address, wherein the one or more packets are received via the access network entity associated with the session layer internet protocol address of the user endpoint device.

18. The non-transitory computer-readable storage device of claim 17, wherein the sending the request for the session internet protocol address assignment is performed when a response is received for an attach request indicating that the attach request is accepted, wherein the attach request is sent to a controller that controls the access network entity, wherein the attach request is sent using the session layer internet protocol address of the user endpoint device.

19. A method, comprising:
- receiving, via a processor of a controller, from a user endpoint device, an association of a session layer internet protocol address of the user endpoint device with a session internet protocol address, wherein the user endpoint device has been granted an attachment via the session layer internet protocol address prior to receiving the association, wherein the session layer internet protocol address of the user endpoint device is generated by combining a physical address of the user endpoint device with a prefix of an access network entity that is received from the access network entity;
- providing, via the processor, to a network node, an update on a route to reach the session internet protocol address through the session layer internet protocol address;
- identifying an active session layer internet protocol address of the user endpoint device to receive one or more packets, when the one or more packets are received for the user endpoint device; and
- configuring an open flow switch or router for routing the one or more packets towards the active session layer internet protocol address of the user endpoint device that is identified.

20. The method of claim 19, further comprising:
- determining, via the processor, if an updated association of the session layer internet protocol address with the session internet protocol address is received from the user endpoint device; and
- providing, via the processor, to the network node, another update on the route to reach the session internet protocol address through the session layer internet protocol address in accordance with the updated association, when the updated association is received.

* * * * *